United States Patent [19]
Crawmer et al.

[11] Patent Number: 5,762,727
[45] Date of Patent: Jun. 9, 1998

[54] WELD REPAIR PROCESS AND ARTICLE REPAIRED THEREBY

[75] Inventors: Gerald Richard Crawmer, Clifton Park; John Francis Nolan, Latham, both of N.Y.

[73] Assignee: General Electric Company, Schenectady, N.Y.

[21] Appl. No.: 843,175

[22] Filed: Apr. 14, 1997

[51] Int. Cl.$^6$ .................................... B23K 31/02
[52] U.S. Cl. ............... 148/524; 148/528; 148/529; 228/119
[58] Field of Search .................. 148/524, 525, 148/528, 529; 228/119

[56] References Cited

U.S. PATENT DOCUMENTS

| | | | |
|---|---|---|---|
| 4,484,959 | 11/1984 | Boucher et al. | 148/524 |
| 4,903,888 | 2/1990 | Clark et al. | 228/119 |
| 5,674,419 | 10/1997 | Koide et al. | 148/524 |

OTHER PUBLICATIONS

*ASM Handbook*, vol. 6, pp. 5 and 662–664, ASM, 1993.

*Primary Examiner*—George Wyszomierski
*Attorney, Agent, or Firm*—Domenica N. S. Hartman; Robert C. Lampe, Jr.

[57] ABSTRACT

A method for weld repairing an article formed of a low-alloy steel, such as a steam turbine component. The method generally includes the step of depositing a first weld repair (14) on a surface of the article, during which a hard heat-affected zone (HAZ) (18) having a fine grain size is formed in the article beneath the surface on which the weld repair (14) is deposited. The first weld repair (14) and at least a portion of the HAZ (18) adjacent the first weld repair (14) are then locally heat treated at a temperature above a critical temperature $A_1$ of the alloy from which the article is formed. As a result of this localized heat treatment, the original grain structures of the first weld repair (14) and the HAZ (18) are entirely replaced with a fine-grain structure with acceptable hardness. Thereafter, at least one additional weld repair layer (16) is deposited on the first weld repair (14). The first weld repair (14) is intentionally formed to have a sufficient thickness to avoid formation of additional HAZ in the surface of the article as the additional weld repair layer (16) is deposited. Without a post-weld heat treatment of the additional weld repair layer (16) or the article as a whole, the method yields a repair weld (12) that exhibits properties that are comparable to and can even exceed that of the base material (10) of the article.

18 Claims, 3 Drawing Sheets

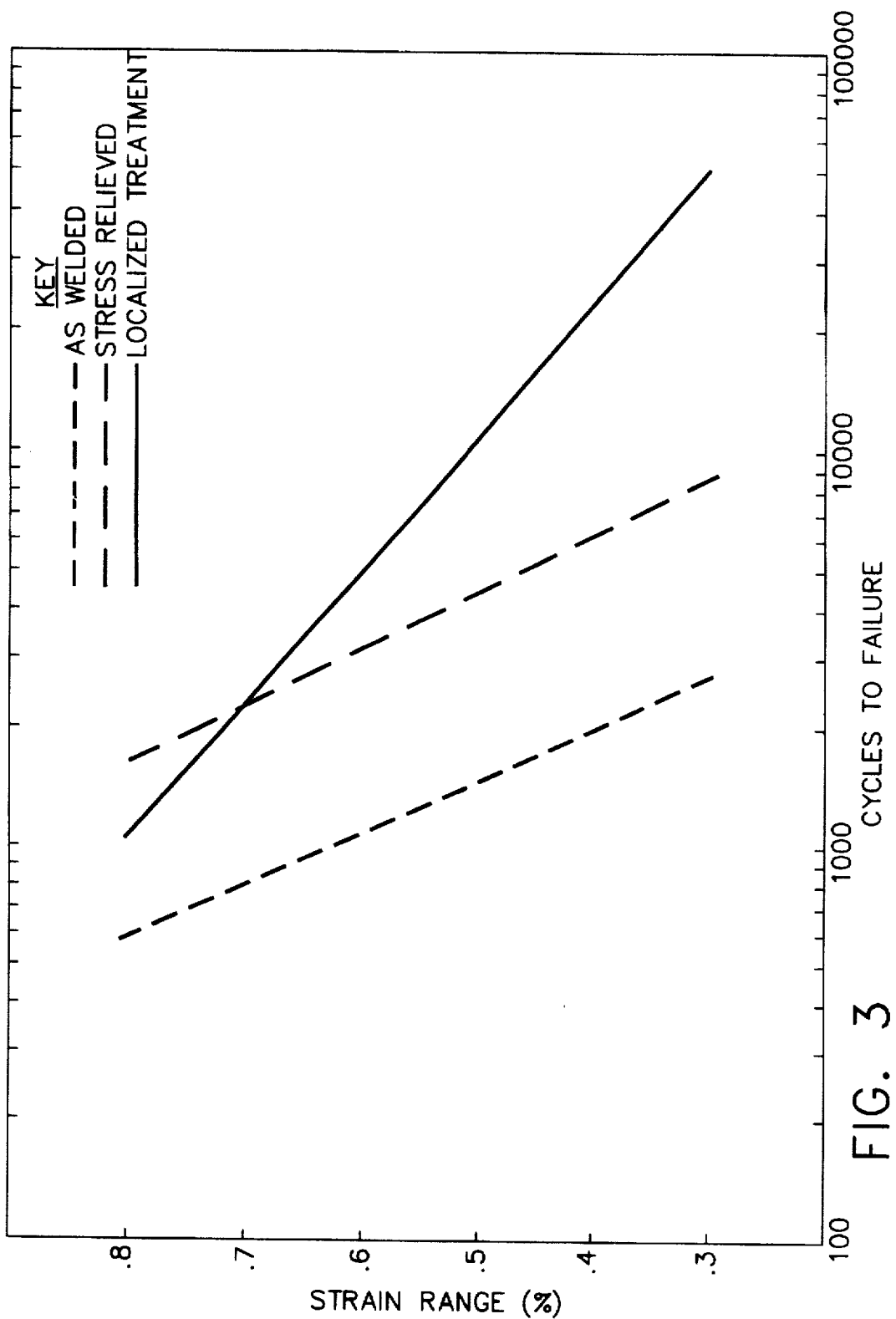

WELD REPAIR PROCESS AND ARTICLE REPAIRED THEREBY

FIELD OF THE INVENTION

The present invention relates to welding processes. More particularly, this invention relates to a method for weld repairing a steel alloy article, the method entailing a localized heat treatment technique that is applied to a limited intermediate region of the weld repair prior to completion of the weld repair, and avoids a full post-weld heat treatment of the article.

BACKGROUND OF THE INVENTION

Chromium-molybdenum (CrMo) and chromium-molybdenum vanadinun (CrMoV) low-alloy steels have found wide use for components of steam turbines and other power plant applications. These alloys have been selected in part on the basis of creep and fatigue properties due to the severe operating conditions of steam turbine components. Although steam turbine components made from CrMo and CrMoV steels exhibit a long service life, it is possible that wear, erosion, corrosion, shock, fatigue and/or overstress will occur, necessitating repair or replacement of the component. In the past, repairs of CrMo and CrMoV components have often been performed by welding, in which the damaged portion of the component is removed and a steel weldment is built up in its place. After repair, the component has traditionally undergone a postweld heat treatment (PWHT) in order to relieve stresses induced by the weld repair process and to temper the hardened weld heat-affected zone (HAZ), thereby developing properties similar to that of the original alloy.

Comparative hardness data for as-welded and post-weld heat treated CrMoV alloy is shown in FIG. 2. Hardness is measured within the HAZ of the weld region, where the chemical composition of the base alloy is generally unchanged by the welding operation but considerable microstructural change has occurred as a result of the severe thermal cycle that takes place during welding. One effect of this microstructural change is that considerable hardening occurs within the HAZ. In FIG. 2, hardness is indicated within the HAZ relative to the distance from the fusion line, defined here as the interface between the weld repair material and the base material of the component. Because weld-induced hardness is detrimental to creep and fatigue properties, FIG. 2 evidences that post-weld heat treatment is needed to promote these desirable properties in a weld-repaired component.

In the past, post-weld heat treatment has entailed heating the entire component to a temperature below the critical temperature "$A_1$" of the alloy, which is defined in the art as the lower limit of the face-centered cubic lattice crystallographic structure (austenite) of the iron-carbon equilibrium diagram. A drawback to this process is the cost of the heat treatment operation, the time involved to perform the operation, and the possibility of distorting the component. These drawbacks are particularly problematic in the repair of high-temperature components that have heightened creep resistance requirements, such as the CrMoV turbine lower shell of a steam turbine. Removal of these components for post-weld heat treatment is costly and time-consuming due to piping connections that must be cut and rewelded, realignment of the turbine after repair, etc. However, repair of such components without a post-weld heat treatment generally yields unsuitable results, and attempts at in-situ post-weld heat treatment have a tendency to distort the shell.

Consequently, weld repair techniques have been proposed using filler materials that do not require post-weld heat treatment. However, such techniques are generally limited to temporary repairs and some noncritical applications, because weld repairs that undergo post-weld heat treatment generally exhibit superior properties. Other alternatives for making weld repairs without post-weld heat treatment include various temperbead welding techniques, in which a carefully controlled welding sequence provides some degree of tempering by superimposing a suitable temperature region of the HAZ from the weld bead being deposited on a hard portion of a HAZ from a previously deposited weld bead. Such techniques have been performed in an attempt to provide beneficial softening of hard metallurgical structures in the HAZ. However, when applied to some CrMo and CrMoV alloy steel components, undesirable HAZ hardening has been found, as evidenced by the data scatterband for temperbead techniques shown in FIG. 2.

Accordingly, what is needed is a reliable weld repair technique for low-alloy steels, such as CrMo and CrMoV alloys used to form steam turbine components, that produces a long-lasting weld repair without resorting to post-weld heat treatment of the repaired component and without causing distortion of the component.

SUMMARY OF THE INVENTION

According to the present invention, there is provided a method for weld repairing an article formed of a low-alloy steel. The method does not require a full post-weld heat treatment of the component or the entire weld repair region of the component, and therefore avoids the disadvantages associated with performing such treatments. Instead, the method of this invention is relatively uncomplicated and yields a repaired article whose mechanical and environmental properties are comparable to that of the base material of the article. According to this invention, though the method is particularly suited for the repair of CrMo and CrMoV low-alloy steels, the method could be applied to other low-alloy steels, as the term is understood by those skilled in the art.

The method of this invention generally includes the steps of depositing one or more layers of a first weld repair on a surface of the article, which will typically be a region of the base material of the article which has been exposed by removing a damaged region of the article. The exposed surface may be defined by a cavity or groove in the base material, or otherwise have any shape or topography to adequately remove the damaged region of the article, facilitate the welding process and/or enhance the resulting weld repair. During deposition of the first weld repair, a hard heat-affected zone (HAZ) is formed in the article beneath the surface of the article. The first weld repair and at least a portion of the HAZ adjacent the first weld repair are then locally heat treated at a temperature above the critical temperature of the base material, i.e., the lower limit of the austenite phase field of the iron-carbon equilibrium diagram for the alloy. According to the invention, a preferred minimum temperature for CrMo and CrMoV alloys is about 1500° F. (about 815° C.), with a maximum temperature being about 1600° F. (about 870° C.) in order to prevent excessive grain growth in the HAZ. As a result of this localized heat treatment, the original grain structures of the first weld repair and the HAZ are entirely replaced with a fine-grain structure with acceptable hardness. Thereafter, at least one additional weld repair layer is deposited on the first weld repair. According to the invention, the first weld repair is intentionally formed to have a sufficient thickness to avoid

3 formation of additional HAZ in the base material of the article as the additional weld repair layer is deposited.

According to this invention, the above process has been unexpectedly determined to yield a repair weld that exhibits mechanical and environmental properties that are comparable to and can even exceed that of the base material of the article, so as to yield a repair that will have a long service life. Accordingly, further processing of the article and subsequent placement of the article in service can proceed without a post-weld heat treatment of the additional weld repair layer or the article as a whole. Another advantage is that the above process is able to achieve beneficial properties for the article using known and relatively uncomplicated welding techniques to form each of the weld repair layers.

Other objects and advantages of this invention will be better appreciated from the following detailed description.

DESCRIPTION OF THE DRAWINGS

FIG. 3 is a graph representing comparative low-cycle fatigue data for a low-alloy steel repaired in accordance with this invention and the same low-alloy steel repaired in accordance with the prior art.

DETAILED DESCRIPTION OF THE INVENTION

Figure 1:
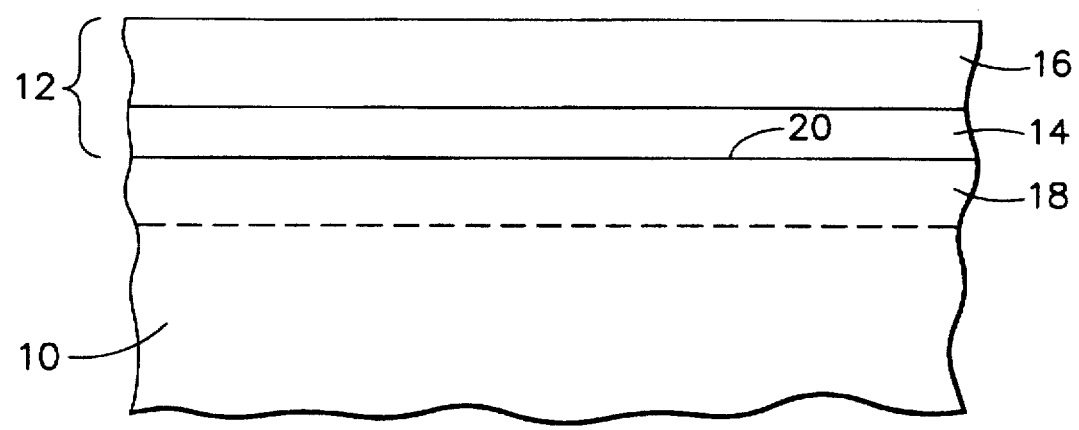
FIG. 1 represents a cross-section of a weld repair formed in accordance with this invention.
Figure 2:
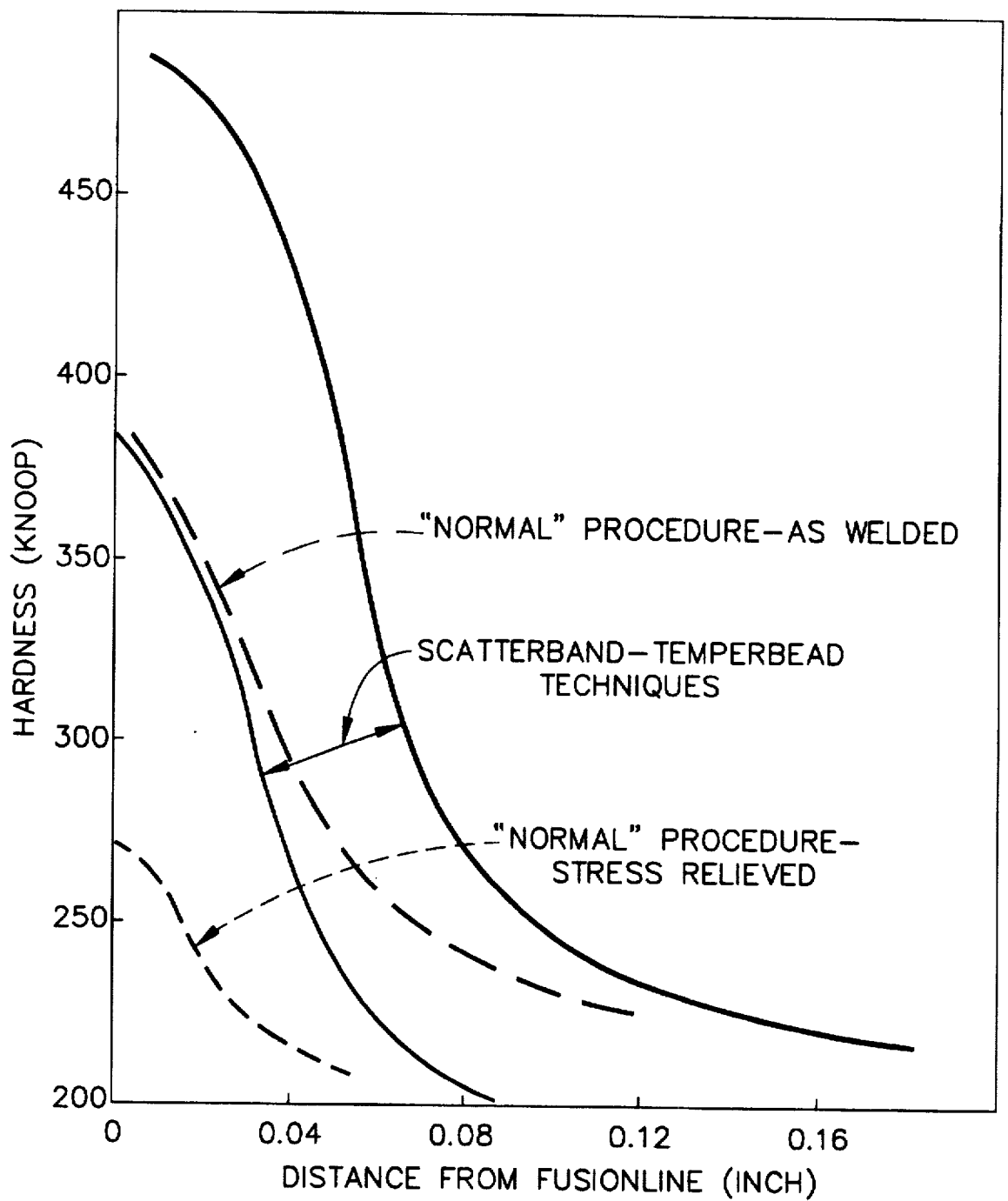
FIG. 2 is a graph representing hardness variations within the HAZ of a weld repair region in a low-alloy steel repaired in accordance with the prior art.

FIG. 1 represents in cross-section a low-alloy steel article that has been repaired in accordance with this invention. An example of such an article is a component of a steam turbine, though a wide variety of components could be repaired by the method of this invention. As represented in FIG. 1, the article generally includes a base material 10 on which a weld repair 12 has been built up to restore the article to its original dimensions after a damaged portion has been removed. The weld repair 12 generally includes one or more weld repair layers that have been deposited on the surface of the base material 10 to yield a surfacing weld repair 14. In turn, a fill weld layer 16 is shown as having been deposited on the surfacing weld repair 14. The interface between the surfacing weld repair 14 and the base material 10 is termed the fusion line 20 of the weld repair 12. According to this invention, when repairing CrMoV and CrMo alloys of the type used to form steam turbine components, an example of which is 1.25Cr-1Mo-0.25V (in weight percent), suitable materials for the weld repair 14 and weld layer 16 include CrMo and CrMoV alloys. A particularly suitable CrMo alloy has a nominal composition, in weight percent, of about 0.5 chromium, about 1.0 molybdenum, not more than about 0.05 carbon, and lesser amounts of other elements. According to the invention, the low carbon content for the repair alloys has been found to be particularly important for achieving acceptable as-welded high temperature properties.

During the investigation leading to this invention, the occurrence of undesirable hardening of the HAZ produced by temperbead techniques performed on CrMoV steels was determined to be a result of the secondary hardening characteristic of such steels, evidencing that the retention time at a sufficient tempering temperature is of too short a duration. As a solution to this problem, the present invention is based on the determination that local heat treatment applied to a limited portion of the weld immediately adjacent the base material 10 can provide sufficient retention time to improve the properties of the HAZ 18 in the base material 10. Tests employing temperatures above the critical temperature "$A_1$" of the base material alloy have shown dramatic improvement over tests employing conventional stress-relief temperatures, i.e., post-weld heat treatments performed below the Al temperature of the base material alloy.

The preferred method for repairing a low-alloy steel article in accordance with this invention generally entails completely removing the damaged portion of the article. The surfacing weld repair 14 is then formed by depositing one or more weld layers on the newly-exposed surface of the base material 10 using a suitable welding technique, such as a shielded metal arc welding (SMAW), though it is foreseeable that other techniques could be employed. The process of depositing the surfacing weld repair 14 on the base material 10 produces the HAZ 18 shown in FIG. 1. For the repair of a CrMo or CrMoV alloy, such as 1.25Cr-1Mo-0.25V, a suitable material for the surfacing weld repair 14 is a CrMo low-alloy steel, and particularly the above-noted 0.5Cr-1Mo alloy having a low carbon content Of 0.05 weight percent or less.

The total thickness of the surfacing weld repair 14 is selected such that local heat treatment of the weld repair 14 and the underlying HAZ 18 can be readily accomplished, yet the subsequently deposited fill weld layer 16 will not produce additional HAZ in the base material 10. A localized heat treatment is then performed on the weld repair 14 and the HAZ 18. For a CrMo or CrMoV alloy, the critical temperature $A_1$ is about 1370° F. (about 745° C.). Therefore, according to this invention the heat treatment is performed at a temperature of at least about 1420° F. (about 770° C.), and preferably between about 1500° F. (about 815° C.) and about 1600° F. (about 870° C.). A suitable duration for this heat treatment step is up to about fifteen minutes, though longer durations are foreseeable. In this temperature range, a suitable thickness for the surfacing weld repair 14 is about four to about eight millimeters.

Importantly, metallographic examination of the repaired region at this stage of the process has shown that the surfacing weld repair 14 and the HAZ 18 are preferably characterized by a hardness of not higher than about 365 Knoop and a grain size of not larger than about ASTM 6. Following heat treatment, the fill weld layer 16 can be deposited using conventional welding techniques, such as shielded metal arc welding. For the repair of CrMo and CrMoV alloys, the above-noted low carbon 0.5Cr-1Mo alloy has been found advantageous for this purpose.

During the investigation of this invention, the repair method described above was performed on cast 1.25Cr1Mo-0.25V alloy specimens. A surfacing weld repair 14 of the above-noted low carbon 0.5Cr-1Mo alloy was deposited on each specimen using a shielded metal arc welding electrode to produce a HAZ 18 in the surface of the specimen. The surfacing weld repair 14 and the underlying HAZ 18 were then locally torch heated to a temperature of about 1500° F. to about 1600° F., i.e., above the critical $A_1$ temperature of about 1400° F. (about 760° C.) for the steel, for a duration of about five to ten minutes. Subsequent metallographic examination of the specimens revealed that the former HAZ 18 and surfacing weld repair 14 were entirely replaced with a fine-grain structure with acceptable hardness properties, generally a hardness of not greater than about 365 Knoop. A weld repair 12 was then completed by forming a fill weld layer 16 of the low carbon 0.5Cr-1Mo alloy using the same shielded metal arc welding technique used to deposit the surfacing weld repair 14. In accordance with this invention, the fill weld layer 16 did not undergo any post-weld heat treatment, and therefore remained in the as-welded condition.

Specimens were then randomly selected to undergo creep rupture testing at temperatures ranging from about 1050° F. to about 1200° F. (about 565° C. to about 650° C.), and at loads corresponding to rupture at Larson-Miller parameter values of about 33.6 to about 36.6. The results of this test were that the creep properties of the specimens were found to be comparable to cast 1.25Cr-1Mo-0.25V alloy specimens that are repaired by the conventional method using a 0.5Cr-1Mo weld filler alloy and then subjected to a full post-weld heat treatment below the critical temperature $A_1$ of the alloy.

Other specimens were subjected to low-cycle fatigue testing at about 1050° F. (about 565° C.), with complete strain reversal and no hold time. For comparison, two sets of specimens were prepared using the conventional weld repair method with a conventional 0.5Cr-1Mo filler metal (i.e., having a carbon content of about 0.07 to about 0.15 weight percent), one set with and the second without a full post-weld heat treatment. The results of this test are represented in FIG. 3, which evidences that specimens prepared using the conventional weld repair method with full post-weld heat treatment performed significantly better than those repaired conventionally but without the post-weld heat treatment. Most notably, those specimens processed in accordance with this invention exhibited low-cycle fatigue resistance comparable to or better than the conventionally-processed specimens with post-weld heat treatment, as indicated in FIG. 3.

From the above, it was concluded that reliable repairs were achieved with the repair process of this invention, and that low-alloy steel components repaired according to this invention can be expected to exhibit service lives that are comparable to low-alloy steel components conventionally repaired with a conventional full post-weld heat treatment.

While our invention has been described in terms of a preferred embodiment, it is apparent that other forms could be adopted by one skilled in the art. Therefore, the scope of our invention is to be limited only by the following claims.

What is claimed is:

1. A method for repairing a steel alloy article, the method comprising the steps of:
   depositing at least a first weld repair layer on a surface of the article so as to form a heat affected zone in the article beneath the surface;
   locally heat treating the first weld repair layer and at least a portion of the heat affected zone adjacent the first weld repair layer at a temperature above the critical $A_1$ temperature of the steel alloy article;
   depositing at least one additional weld repair layer on the first weld repair layer without forming additional heat affected zone in the surface of the article; and
   placing the article in service without a post-weld heat treatment of the additional weld repair layer following the step of depositing the additional weld repair layer.

2. A method as recited in claim 1, wherein the first weld repair layer is a CrMo low-alloy steel.

3. A method as recited in claim 1, wherein the additional weld repair layer is a CrMo low-alloy steel.

4. A method as recited in claim 1, wherein the first weld repair layer and the additional weld repair layer are formed of a 0.5Cr-1Mo low-alloy steel.

5. A method as recited in claim 4, wherein the 0.5Cr-1Mo low-alloy steel has a carbon content of not higher than 0.05 weight percent.

6. A method as recited in claim 1, wherein the locally heat treating step is performed for up to about fifteen minutes.

7. A method as recited in claim 1, wherein the first weld repair layer and the heat affected zone have a grain size of not larger than about ASTM 6 after the heat treatment step.

8. A method as recited in claim 1, wherein the first weld repair layer and the heat affected zone have a hardness of not higher than about 365 Knoop after the heat treatment step.

9. A method as recited in claim 1, wherein each of the depositing steps entails a shielded metal arc welding technique.

10. A method as recited in claim 1, wherein the article is formed of a steel alloy chosen from the group consisting of CrMo and CrMoV low-alloy steels.

11. A method as recited in claim 1, wherein the article is a component of a steam turbine.

12. A method for repairing a low-alloy steel article, the method comprising the steps of:
   removing a surface portion of the article so as to define a base surface of the article;
   depositing at least one weld repair layer on the base surface so as to form a first weld repair on the base surface and a heat affected zone in the article beneath the base surface, the first weld repair being a CrMo low-alloy steel and having a thickness of about four to about eight millimeters;
   locally heat treating the first weld repair and at least a portion of the heat affected zone adjacent the first weld repair at a temperature of about 1500° F. to about 1600° F.;
   depositing a fill weld layer on the first weld repair without forming additional heat affected zone in the base surface, the fill weld layer being a CrMo low-alloy steel; and
   subsequently placing the article in service without a post-weld heat treatment of the fill weld layer following the step of depositing the fill weld layer.

13. A method as recited in claim 12, wherein the first weld repair and the fill weld layer are a 0.5Cr-1Mo low-alloy steel having a carbon content of not higher than 0.05 weight percent.

14. A method as recited in claim 12, wherein the first weld layer and the heat affected zone have a grain size of not larger than about ASTM 6 after the heat treatment step.

15. A method as recited in claim 12, wherein the first weld layer and the heat affected zone have a hardness of not higher than about 365 Knoop after the heat treatment step.

16. A method as recited in claim 12, wherein each of the depositing steps entails a shielded metal arc welding technique.

17. A method as recited in claim 12, wherein the article is formed of a low-alloy steel chosen from the group consisting of CrMo and CrMoV low-alloy steels.

18. A method as recited in claim 12, wherein the article is a component of a steam turbine.

* * * * *